H. L. Hopkins,
Piston-Rod Packing.
No. 48,686. Patented July 11, 1865.
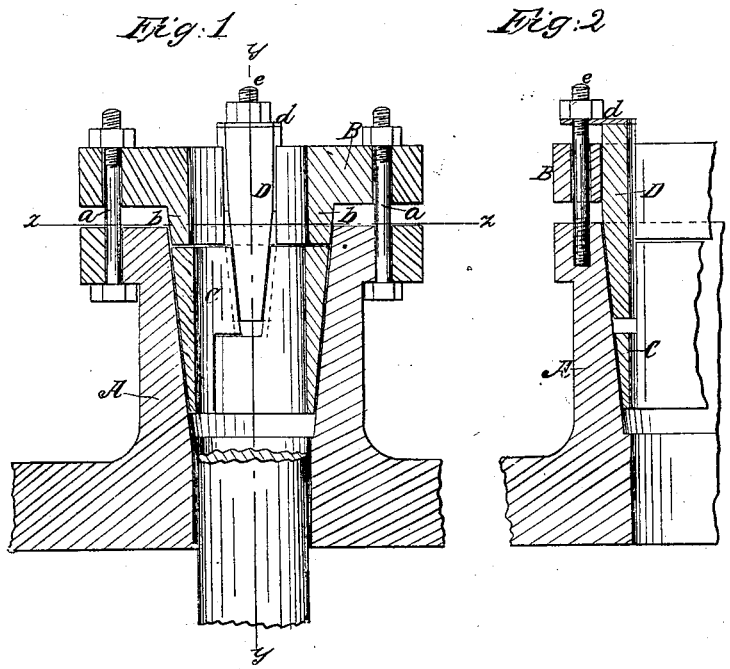
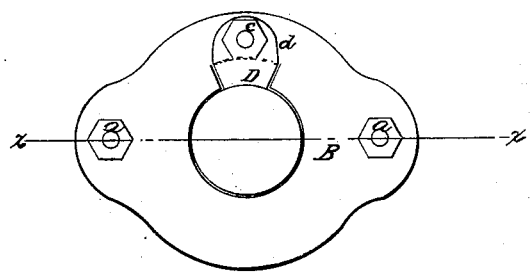
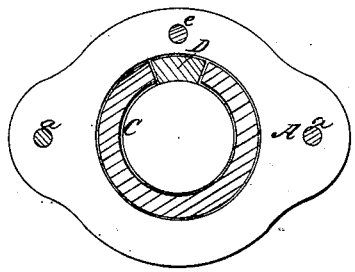
Witnesses:
M. Ahearn
Theo Tusch
Inventor:
H L Hopkins
per Munn & Co
Atty

UNITED STATES PATENT OFFICE.

H. L. HOPKINS, OF SAN FRANCISCO, CALIFORNIA.

IMPROVEMENT IN METALLIC PACKING-BOXES.

Specification forming part of Letters Patent No. 48,686, dated July 11, 1865.

*To all whom it may concern:*

Be it known that I, H. L. HOPKINS, of San Francisco, in the county of San Francisco and State of California, have invented a new and Improved Metallic Journal and Stuffing Box; and I do hereby declare that the following is a full, clear, and exact description thereof, which will enable others skilled in the art to make and use the same, reference being had to the accompanying drawings, forming part of this specification, in which—

Figure 1 is a longitudinal central section of this invention, the line $x\ x$, Fig. 3, indicating the plane of section. Fig. 2 is a similar section in the plane indicated by the line $y\ y$, Fig. 1. Fig. 3 is a plan or top view of the same. Fig. 4 is a horizontal section of the same, taken in the plane indicated by the line $z\ z$, Fig. 1.

Similar letters of reference indicate like parts.

This invention consists in a conical box with a follower, in combination with a sectional or split lining, and key made tapering to correspond to the shape of the box and lining, and also adjustable by a set-screw, or other equivalent means, in such a manner that by the action of the follower the lining can be depressed and set up against the rod or shaft passing through the box, and by the key the pressure of the lining on said shaft or rod can be regulated and adjusted with the greatest ease and facility.

A represents the box, cast of iron, or made of any other suitable material, and intended for a stuffing-box of a piston-rod, though it must be remarked that my invention is applicable as well to journal-boxes of any description. Said box is bored out conical, as clearly shown in Fig. 1, and it is provided with a follower or cap, B, which is secured to its place by a series of screw-bolts, $a$. Said follower or cap is provided with a flange or rim, $b$, which bears on the upper edge of the lining C. This lining is tapering to correspond to the interior of the box A, and it is split open or made in sections, as shown in Fig. 1, so that by screwing up the nuts on the bolts $a$ the flange $b$ of the lining depresses said lining into the box and causes it to close up against the shaft or rod passing through it.

D is a key, which is fitted into a suitable seat cut into the lining, as shown particularly in Figs. 1 and 4. This key is tapering to correspond to the taper of the box and lining, and it is provided with a lip, $d$, through which a set-screw, $e$, passes, as shown in Fig. 2. By the action of this set-screw the wedge can be depressed. The pressure of the lining against the outer surface of the shaft or rod passing through it can be adjusted with the greatest nicety. The set-screw $e$ passes through the follower and screws into the body of the box A; but it must be remarked that said set-screw might be arranged in different ways, and instead of a set-screw a wedge or other equivalent device might be employed to adjust the key, though I use the screw by preference.

The lining C may be made of any kind of metal, though I make it, by preference, of Babbitt metal, since by doing so I am enabled to cast the same in its place in a great many cases.

The key may be made of the same metal as the lining, or of some other material, if desired.

My invention is particularly applicable to stuffing-boxes for piston and other rods; but it also can be used with great advantage for axle-boxes—for instance, for the boxes of propeller-shafts or other shafts where it is desirable to produce a tight joint.

I claim as new and desire to secure by Letters Patent—

The tapering split or sectional lining C, with expanding wedge D, in combination with the box A and follower or cap B, constructed and operating substantially as and for the purpose described.

H. L. HOPKINS.

Witnesses:
E. H. PECKHAM,
W. M. GUITY,